UNITED STATES PATENT OFFICE.

JUSTIN DUTREY, OF NEW ORLEANS, LOUISIANA.

COMPOSITION FOR PRODUCING ARTIFICIAL-EMERY WHEELS.

SPECIFICATION forming part of Letters Patent No. 510,874, dated December 12, 1893.

Application filed May 25, 1893. Serial No. 475,520. (No specimens.)

*To all whom it may concern:*

Be it known that I, JUSTIN DUTREY, a citizen of the United States residing at New Orleans, in the parish of Orleans and State of Louisiana, have invented certain new and useful Improvements in a Composition for Producing an Artificial-Emery Wheel; and I do declare the following to be a full, clear, and exact description of the invention, such as will enable others skilled in the art to which it appertains to make and use the same.

My composition consists of the following ingredients, combined in the proportions stated, viz:—sulphur, fifty pounds; Portland cement, fifty pounds; emery, coarse or fine, fifty pounds; English Venetian red, six pounds; common sugar, six pounds. These ingredients are to be thoroughly mingled.

In using the above composition, the ingredients should be placed in a vessel and stirred until all the ingredients are mingled, and then removed in such quantities as may be desired and placed in molds to form a wheel of any desired size.

What I claim, and desire to secure by Letters Patent of the United States, is—

The herein described composition of matter to be used for producing artificial emery wheels, consisting of sulphur, Portland cement, emery (coarse or fine), Venetian red and common sugar in the proportions specified.

In testimony whereof I affix my signature in presence of two witnesses.

JUSTIN DUTREY.

Witnesses:
RICARDO DUE,
WILLIAM WILSON.